United States Patent
Farrell et al.

(10) Patent No.: US 8,315,928 B1
(45) Date of Patent: Nov. 20, 2012

(54) SYSTEMS AND METHODS FOR VALIDATING A MODEL

(75) Inventors: Brian T. Farrell, McLean, VA (US); Herman J. Aparicio, Sterling, VA (US); Jesus A. Bauza-Montenegro, Fairfax, VA (US); Anita L. Champ, Great Falls, VA (US); Doris J. Eversmeyer, Sterling, VA (US); Matthew J. W. Porter, Fairfax, VA (US); Loren E. Snyder, Ashburn, VA (US); Wei Zhou, Potomac Falls, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 898 days.

(21) Appl. No.: 11/094,207

(22) Filed: Mar. 31, 2005

Related U.S. Application Data

(63) Continuation of application No. 10/972,005, filed on Oct. 25, 2004, now abandoned.

(60) Provisional application No. 60/547,419, filed on Feb. 26, 2004.

(51) Int. Cl.
    *G06Q 40/00* (2006.01)

(52) U.S. Cl. ......................................................... 705/35
(58) Field of Classification Search ..................... 705/35
    See application file for complete search history.

(56) References Cited

U.S. PATENT DOCUMENTS

| | | | |
|---|---|---|---|
| 5,689,579 A * | 11/1997 | Josephson | 382/137 |
| 6,882,983 B2 * | 4/2005 | Furphy et al. | 705/30 |
| 7,340,427 B1 * | 3/2008 | Cornell | 705/37 |
| 2004/0030676 A1 * | 2/2004 | Wagner | 707/2 |

OTHER PUBLICATIONS

Standard & Poor's, "Global Cash Flow and Synthetic CDO Criteria", Mar. 21, 2002, Standard & Poor's, a Division of The McGraw-Hill Companies, Inc.*

* cited by examiner

*Primary Examiner* — Eric T Wong
(74) *Attorney, Agent, or Firm* — Finnegan, Henderson, Farabow, Garrett & Dunner, LLP

(57) ABSTRACT

Systems and methods are described for validating a model that generates cash flow distributions. The systems and methods receive a first set of data and generate a second set of data, associated with the first set of data, based on a set of rules. The system may further request a first set of reports from the first processor and generate a second set of reports based on the first and second sets of data. The reports are compared.

23 Claims, 7 Drawing Sheets

SYSTEMS AND METHODS FOR VALIDATING A MODEL

CROSS REFERENCE TO RELATED APPLICATIONS

This is a continuation of application Ser. No. 10/972,005, filed Oct. 25, 2004 now abandoned, which claims the benefit of U.S. Provisional Patent Application No. 60/547,419, entitled "SYSTEMS AND METHODS FOR VALIDATING SECURITY STRUCTURE," filed on Feb. 26, 2004, the disclosures of which are expressly incorporated herein by reference in their entirety.

BACKGROUND OF THE INVENTION

I. Field of the Invention

The present invention generally relates to financial systems and to systems and methods for validating a model. More particularly, the invention relates to systems and methods for validating a financial model where a mortgage security issuer can ensure that all cash flows for all securities in a transaction match the corresponding cash flows generated by the underwriter of the corresponding securities, so that the mortgage security issuer can settle trades and accurately pay investors.

II. Background and Material Information

Mortgage securities represent an ownership interest in mortgage loans made by financial institutions to finance a borrower's purchase or refinance of real estate or other collateral. Mortgage securities are created when these loans are packaged or pooled by issuers for sale to investors. As the underlying mortgage loans are paid down by the homeowners, the investors receive payments of interest and principal. The most basic mortgage security, referred to as a "passthrough security," represents a direct ownership interest in a pool of mortgage loans. A plurality of mortgage securities may be pooled to serve as collateral for a more complex type of mortgage security known as a Real Estate Mortgage Investment Conduit (REMIC).

A REMIC is a multiclass, mortgage-backed security in which cash flows from the underlying collateral (e.g., a pool of pass-through securities) are allocated to individual groups of bonds, called tranches, of varying maturities, coupons, and payment priorities. Each REMIC includes a set of two or more tranches, each having average lives and cash flow patterns designed to meet specific investment objectives. These tranches are distinguished by their sensitivity to the prepayment risk of the underlying mortgage-related collateral. Therefore, they may have different sensitivities to prepayment risk, bear different interest rates, and have different average lives and final maturities.

REMICs offer investment flexibility because each REMIC may be designed according to specific investor needs or general market demand. As such, an underwriter of the REMIC can provide the issuer of a REMIC with a proposed deal structure before the issuance of the REMIC. It is the responsibility of the issuer to take that structure and validate it for accuracy, e.g., that the cash flows are appropriately allocated across tranches and groups and that there is nothing about the structure that the issuer cannot accurately disclose. Additionally, the underwriter validates that the issuer should be able to settle any trades on a timely basis and accurately make monthly payments to investors after any bonds in a REMIC are sold.

SUMMARY OF THE INVENTION

A method consistent with this present invention for validating a model for cash flow distribution comprises receiving a first set of data representative of a deal structure and generates a second set of data, associated with the first set of data, and is representative of prepayment scenarios of the deal structure. The generation of the distribution is based on a first set of rules and using a data processor. The method also includes obtaining a first set of reports based on the first set of data and the second set of data; generating a second set of reports using the data processor, the second set of reports being based on the first set of data and the second set of data; and comparing the first set of reports and the second set of reports using a second set of rules using the data processor A system of validating a model that generates a cash flow distribution comprises: means for receiving a first set of data representative of a deal structure; means for generating a second set of data by using a data processor to apply a first set of rules to the first set of data, the second set of data representative of prepayment scenarios of the deal structure; means for obtaining a first set of reports based on the first set of data and the second set of data; means for generating a second set of reports using the data processor, the second set of reports being based on the first set of data and the second set of data; and means for comparing the first set of reports and the second set of reports using a second set of rules using the data processor.

Additional features and advantages of the invention will be apparent from the description that follows. Both the foregoing general description and the following detailed description are exemplary and explanatory only, and do not restrict the invention. Further features and/or variations may be provided in addition to those set forth herein.

BRIEF DESCRIPTION OF THE DRAWINGS

The accompanying drawings, which are incorporated in and constitute a part of this specification, illustrate various embodiments and aspects of the present invention and, together with the description, explain the principles of the invention.

In the Drawings.

DETAILED DESCRIPTION

Reference will now be made in detail to exemplary embodiments consistent with the present invention, examples of which are illustrated in the accompanying drawings. Wherever possible, the same reference numbers throughout the drawings refer to the same or like parts. The embodiments are merely examples. Different embodiments are also consistent with the invention, and changes may be made to the embodiments described without departing from the spirit and scope of the invention. The following detailed description does not limit the scope of the claimed invention. Instead, the appended claims define the scope of the invention.

Figure 1:
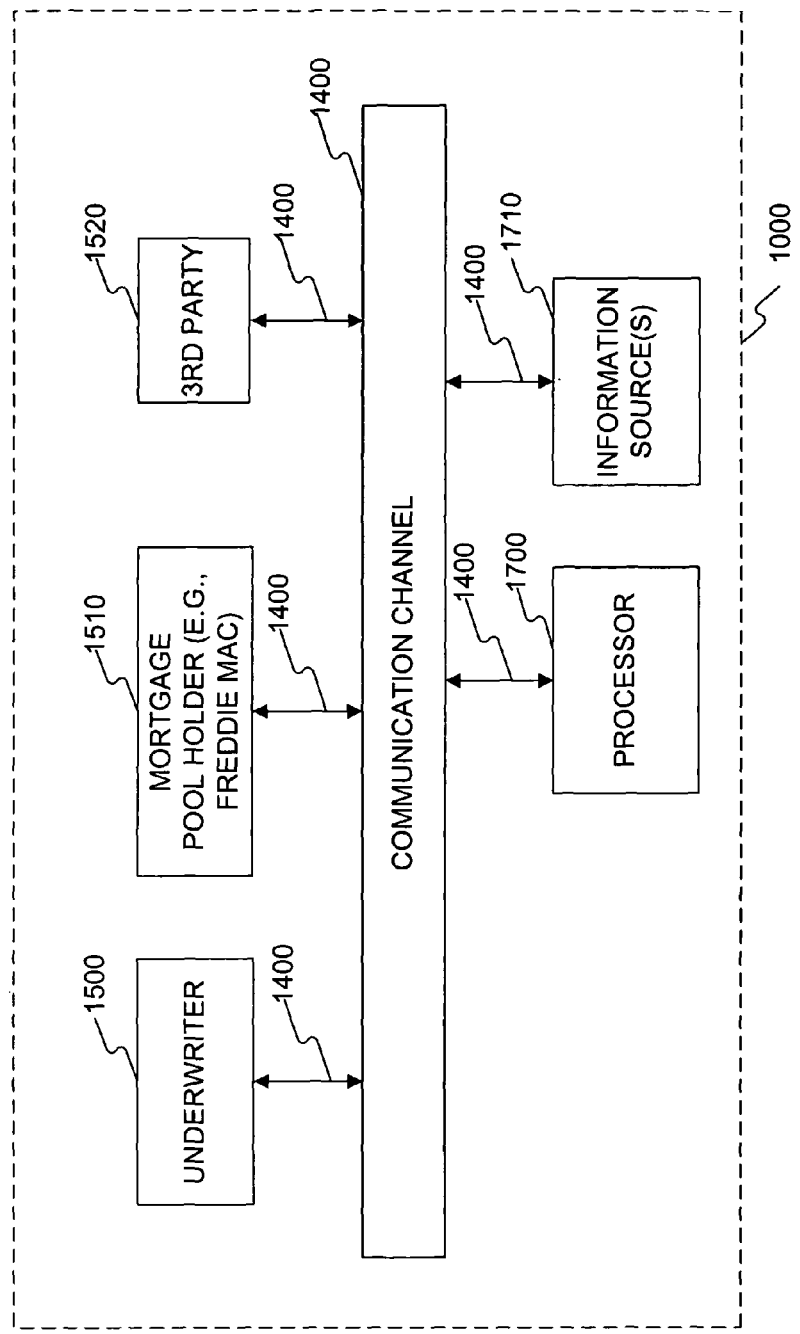
FIG. 1 illustrates an exemplary system environment consistent with the present invention.

FIG. 1 shows an exemplary system 1000 for validating a model. System 1000 includes one or more underwriters 1500, a mortgage security issuer 1510, one or more third parties 1520, a communication channel (or network) 1400, one or more processors 1700, and one or more information sources 1710.

Systems and methods consistent with the present invention permit a financial entity, using system 1000, to validate a model that generates one or more cash flow distributions associated with a deal structure. In one aspect of the invention, the system 1000 validates this model by receiving a deal structure from an underwriter of securities, such as an underwriter 1500. The deal structure may contain one or more tranches, pay rules, and collateral stipulations. The deal structure may also contain one or more rules that represent payments of principal and interest on at least one of the tranches in the deal structure.

The system 1000 may then generate prepayment scenarios by applying an analysis of the prepayment speed used to price each group that is associated with the deal structure to a set of rules that represent procedures for determining a set of prepayment scenarios for the underlying collateral (e.g., bonds, pass through securities, etc.). The system 1000 may send the prepayment scenarios to underwriter 1500 and request that underwriter 1500 return a set of reports based on the prepayment scenarios. The system 1000 may also generate the same type of report as underwriter 1500 using the prepayment scenarios determined by the issuer 1510. These reports may be cash flow reports, decrement tables, yield tables, and retail cash flow reports.

After system 1000 receives the reports from the underwriter 1500, system 1000 may generate a first master file containing the information in the reports from underwriter 1500, and generate a second master file containing the information generated by the issuer 1510 using system 1000.

Next, system 1000 may compare the first and second master files. Any inconsistency (or mismatch) between the first and second files may be written into a summary report. As used herein, the term "match" may not represent an exact match. For example, the values contained within the files may differ by an amount defined by a user of system 1000, such as mortgage security issuer 1510.

Underwriter 1500 may include a financial entity, such as a bank, mortgage bank, or investment bank. An underwriter, also called a "dealer," is a person or entity that guarantees the purchase of a full issue of stocks or bonds. The underwriter may serve as the intermediary between the mortgage security issuer (issuer) 1510 and the investor (not shown), and may offer advice concerning the structure of the mortgage-backed security based on perceived market conditions and investor demand. For example, the underwriter may advise the issuer to issue different tranches, each with specific characteristics attractive to different segments of the market.

Mortgage-security issuer 1510 is an entity that issues mortgage-backed pass-through securities and/or mortgage-backed structured-finance vehicles. Issuer 1510 may be any commercial or government sponsored enterprise, such as the Federal Home Loan Mortgage Corporation ("Freddie Mac"). The third party 1520 may include any entity, such as an investor, auditor, or any other entity associated with the deal.

The processor 1700 may include an entity capable of processing information to validate a deal structure. Any entity may use processor 1700 including, for example, underwriter 1500, mortgage security issuer 1510, and third party 1520. The information sources 1710 may include internal, external, proprietary, and/or public data sources, such as financial data sources providing deal information, market information, and the like.

Figure 2:
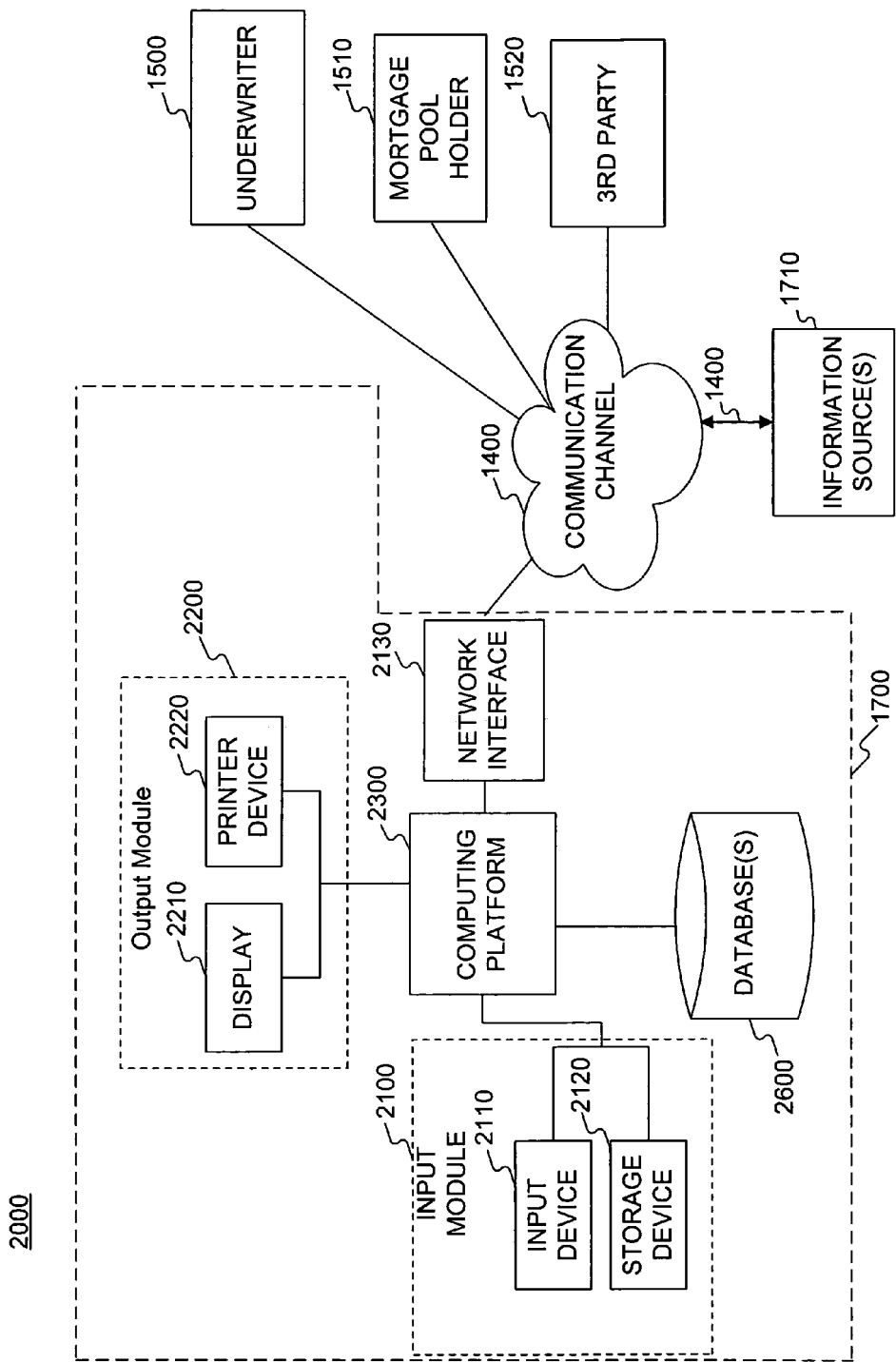
FIG. 2 is another exemplary system environment consistent with the present invention.

FIG. 2 depicts the system of FIG. 1 in greater detail. As illustrated in FIG. 2, the system environment 2000 includes communication channel 1400, one or more underwriters 1500, one or more mortgage security issuers 1510, one or more third parties 1520, and one or more information sources 1710. Processor 1700 may further include an input module 2100, an output module 2200, a computing platform 2300, a network interface 2130, and one or more data sources 2600.

Computing platform 2300 may include a data processor such as a PC, UNIX server (or workstation), or mainframe computer for performing various functions and operations. Computing platform 2300 may include a general purpose computer or data processor, or may be a specially constructed computing platform.

Communication channel 1400 may include, alone or in any suitable combination, a telephony-based network, a local area network (LAN), a wide area network (WAN), a dedicated Intranet, the Internet, a wireless network, a bus, or a backplane. Further, any suitable combination of wired and/or wireless components and systems may be incorporated into communication channel 1400. Channel 1400 may include as bi-directional or unidirectional links. Although shown as connecting to underwriter 1500, mortgage security issuer 1510, and/or third parties 1520 through network interface 2130 and communication channel 1400, computing platform 2300 may also connect directly to those entities.

Computing platform 2300 also communicates with input module 2100 and/or output module 2200 using connections or communication links, as illustrated in FIG. 2. Alternatively, communication between computing platform 2300 and input module 2100 or output module 2200 may be achieved using a network (not shown) similar to that described above for communication channel 1400. Platform 2300 may be located in the same location or at a geographical separate location from input module 2100 and/or output module 2200 by using dedicated communication links or a network.

Input module 2100 may be implemented with a wide variety of devices to receive and/or store information. Referring to FIG. 2, input module 2100 may include an input device 2110 and/or a storage device 2120. Input device 2110 may further include a keyboard, a mouse, a disk drive, a telephone, or any other suitable input device for receiving and/or providing information to computing platform 2300. Although FIG. 2 only illustrates a single input module 2100, a plurality of input modules may also be used. Storage device 2120 may include any of a wide variety of components that can provide sufficient storage capacity and speed.

Network interface 2130 may exchange data between the communication channel 1400 and computing platform 2300. For example, network interface 2130 may permit a connection to at least one or more of the following networks: an Ethernet network, an Internet protocol network, a telephone network, a radio network, a cellular network, a wireless local area network (LAN), or any other network capable of being connected to computing platform 2300.

Output module 2200 may include a display 2210 and/or a printer 2220. Output module 2200 may be used to display and/or print. Moreover, output module 2200 may be used to print or display any information received. Although FIG. 2 only illustrates a single output module 2200, a plurality of spatially separated output modules 2200 may be used.

Figure 3:
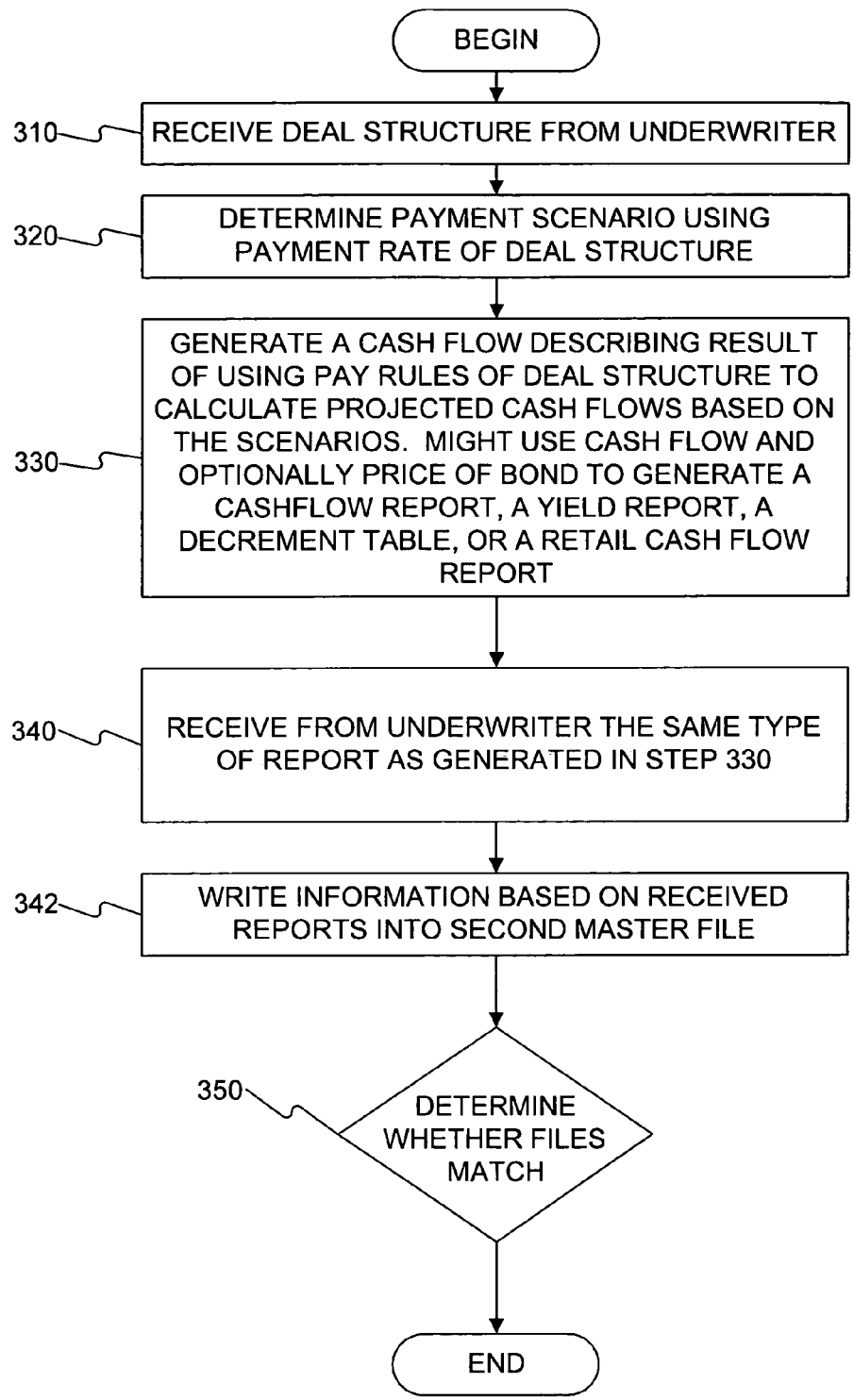
FIG. 3 is an exemplary flow chart for validating a model consistent with the present invention.

FIG. 3 is an exemplary flow chart for validating a model consistent with the present invention. Mortgage security issuer 1510 may receive a deal structure from an underwriter 1500 through communication channel 1400 (step 310). The term "deal structure" is used to define a model where an underwriter defines the cash flow distribution from the underlying collateral over a series of classes, called tranches, which constitute the bond issue. The term "deal structure" and "model" are used herein interchangeably. The deal structure includes rules for paying down the principal of a bond ("principal paydown rules") that govern the payout of the bonds in the REMIC structure. The rules may be created by the underwriter to describe the structure of the cash flows in the deal. The underwriters usually have latitude regarding the type of structure that they devise, so that the deal structure contains bonds with the characteristics customers desire.

Figure 4:
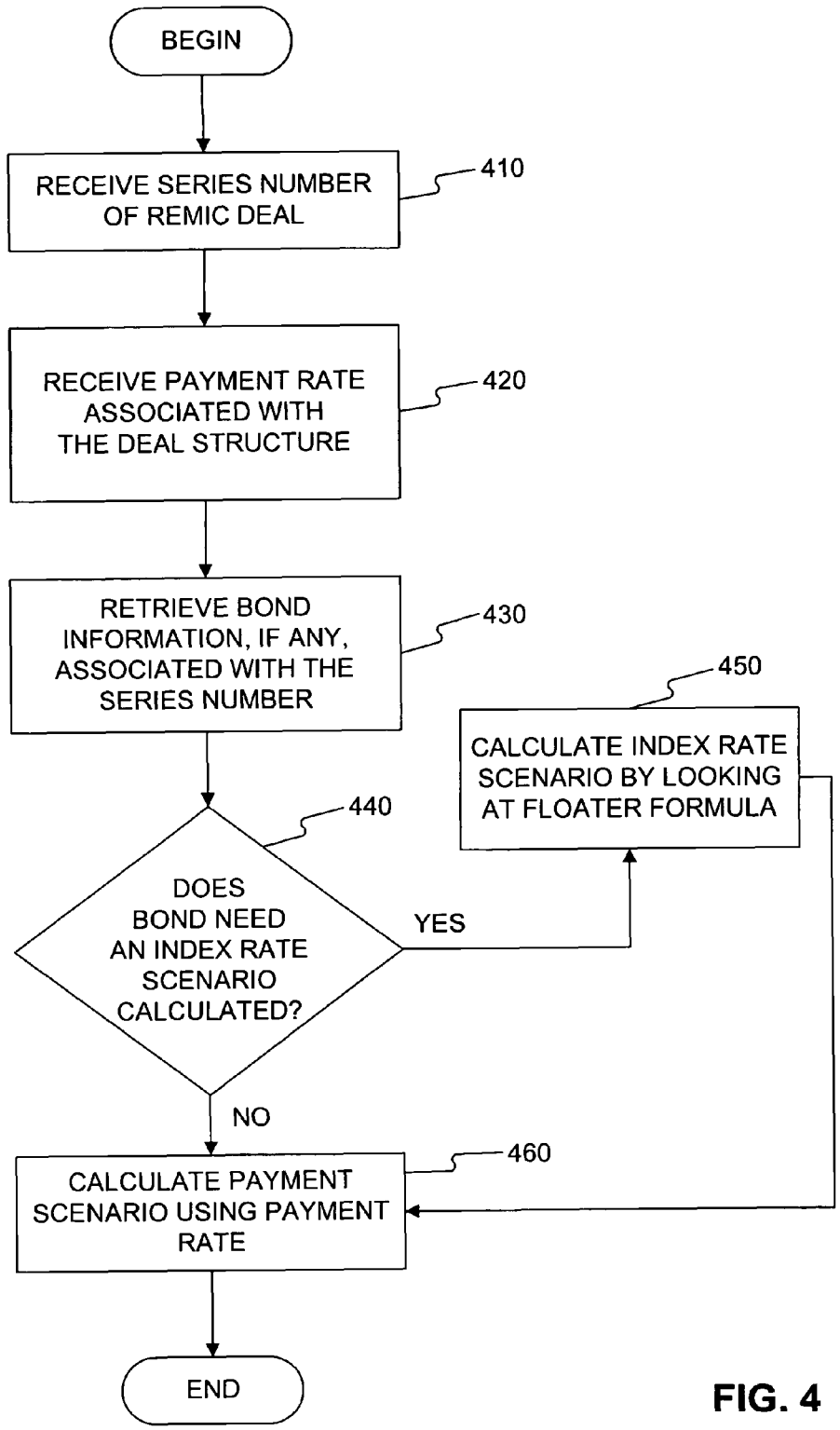
FIG. 4 is an exemplary flow chart, consistent with the present invention, depicting calculation of a prepayment scenario given an analysis of the prepayment speed used to price each group.

FIG. 4 depicts a flow chart describing the receiving step (step 310) of FIG. 3 in more detail. Processor 1700 may first receive a series number of the REMIC deal from mortgage security issuer 1510 (step 410). Processor 1700 may receive a prepayment speed used to price each group associated with the deal structure from the underwriter 1500 (step 420). A prepayment speed is the estimated speed at which the bonds in a REMIC deal may pay out. One example is a 230 PSA, where "230" is, as with all prepayment scenarios, a percentage value, "PSA" indicates that the Prepayment Speed was derived using the Public Securities Association prepayment model, one of several prepayment benchmarks in the mortgage-backed securities market.

Processor 1700 may retrieve, from data source 2600, any bond information associated with the series number (step 430). Once the bond information (if any) is retrieved, processor 1700 determines whether an index rate scenario should be calculated for the bond (step 440). Index rate scenarios are calculated for any bond whose characteristics make their projected yields particularly sensitive to movements in index rates associated with those bonds, for example, Inverse Floater and Interest Only (IO) bonds. Processor 1700 calculates the index rate scenario by looking at the floater formula of the bond (step 450).

Processor 1700 calculates the prepayment scenario, which forecasts conditions under which the bond may pay out. The calculation of this scenario can consider an analysis of the prepayment speed used to price each group associated with the particular bond (e.g., 230 PSA) (step 460).

Referring again to FIG. 3, the deal structure may also include a pricing speed for each group in the deal (e.g., 230 PSA). The pricing speed is a prepayment assumption on the collateral that the underwriter has made for pricing the bonds backed by the collateral. For example, if the underlying collateral includes mortgage loans, the prepayment speed would be the speed at which the mortgage loan obligations are expected to be prepaid to satisfy the mortgage loan. The pricing speed may be used to determine the payment scenarios for the different bonds in the deal structure (step 320).

Payment scenarios are hypothetical, expected prepayments on the underlying mortgages. The scenarios reflect and are reflected using formulas based on standard procedural rules of a mortgage security issuer. The standard procedural rules govern how a mortgage security issuer determines that the mortgage security issuer achieves the most appropriate disclosure of bond characteristics via the mortgage security issuer's prospectus, for example, a prospectus such as Freddie Mac's Offering Circular Supplement.

Processor 1700 may determine a prepayment scenario using the pricing speed of each group of the deal structure, and an index scenario for the bonds in the deal structure. An index scenario is generally derived from the current rate of the benchmark index used in calculating the coupon rate of the bond. For example, if the formula used to calculate the coupon is 7.4%–LIBOR, and the issuer determines that the current rate of the LIBOR index is 1.76%, then the issuer may choose to use 1.76% as an index scenario for the calculation of the bond's Interest cash flow used in determining the projected yield to maturity. The LIBOR index, or the London Inter-Bank Offered Rate, is a rate that large, creditworthy banks charge one another for loans, similar to the Federal Funds rate set by the Federal Reserve in the United States.

Further, the issuer may determine that it is appropriate to disclose additional projected yields to maturity, derived by variations on the current rate of the benchmark. Variations on the benchmark rate may include an assumption that index rate drops by some amount, such as 100 basis points (a basis point is $1/100^{th}$ of 1%). Processor 1700 may use the interest type of the bond, a benchmark index (e.g., the LIBOR index), and a floater formula (e.g., 7.4%–LIBOR) to determine for which of the bonds processor 1700 should calculate an index rate scenario. Each scenario may be stored in data source 2600.

Once processor 1700 generates the prepayment scenarios, it generates a cash flow scenario, which describes the result of using the pay rules that accompany the deal structure (step 330). Processor 1700 may use the cash flow and the price of the bond to generate a cash flow report, a yield report, a decrement table, or a retail cash flow report. A cash flow report is a projected schedule of periodic payments of principal and interest over the projected life of a bond. A yield report shows a calculation of the rate of return on a bond, given a projected set of cash flows, the purchase price of the bond, and its remaining Term to Maturity. A decrement table shows percentages of the original principal balance outstanding as of a given periodic rate (e.g. monthly, quarterly, or annually). A decrement table may also show a Weighted Average Life, calculated based on the rate of principal paydown shown. A retail cash flow report shows the annual availability of principal amounts for payments on retail bonds, if such bonds exist in a given deal.

Figure 5:
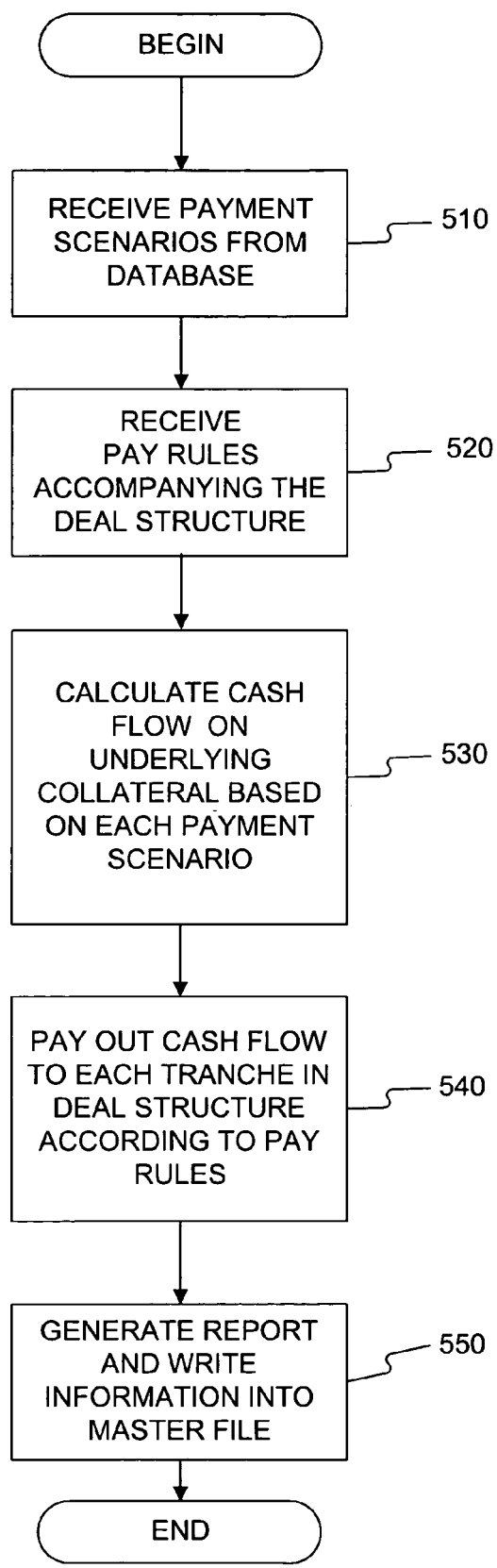
FIG. 5 is an exemplary flow chart depicting an issuer generating a report consistent with the present invention.

FIG. 5 depicts a flow chart with exemplary steps for the generating cash flow step 330 of FIG. 3. Processor 1700 first reads the various prepayment and index-rate scenarios from data source 2600 by running queries to the data source 2600 (step 510). The prepayment and index rate scenarios may be stored together in a separate file. This file containing the prepayment and index rate scenarios may be one that is specific to a mortgage security issuer, for example, Freddie Mac's Dealer Deliverables Checklist (DDC). The Freddie Mac DDC represents a file that contains all the prepayment and index rate scenarios for each deal structure an underwriter creates.

Processor 1700 may then read from data source 2600 a file that contains the pay rules that accompanied the deal structure received from underwriter 1500 (step 520). Processor 1700 may calculate the cash flow on the underlying collateral based on each prepayment scenario received from data source 2600 (step 530). Once the cash flows are calculated, processor 1700 pays the cash flow to each tranche in the deal structure according to the accompanying pay rules (step 540).

Based on these projected cash flows and the assumed price of the bond, processor 1700 can then project a theoretical yield on the bond, assuming that it was purchased at issuance, and held to maturity. Processor 1700 may generate a report for this information and write the information in the report into a master file (step 550). Any report generated by processor 1700 may be in an Extensible Markup Language (XML) format.

Referring again to FIG. 3, once processor 1700 has generated the cash flows based on the pay rules of the deal structure, processor 1700 then may receive from the underwriter the same type of report as generated in step 330 (step 340).

Figure 6:
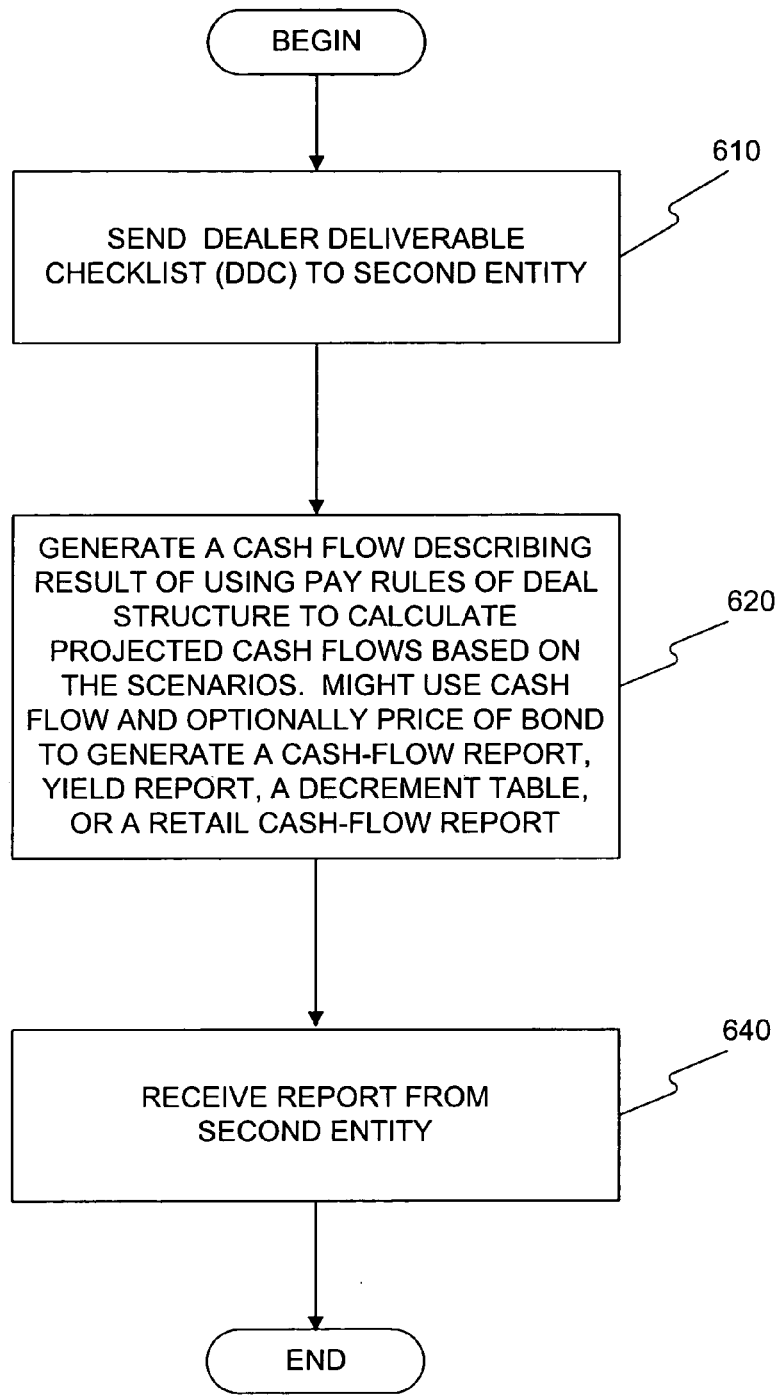
FIG. 6 is an exemplary flow chart depicting an underwriter generating a report in accordance consistent with the present invention.

FIG. 6 is an exemplary flow chart that depicts an underwriter generating a report received by processor 1700 in step 340. Processor 1700 may send to underwriter 1500 the DDC that contains the prepayment and index-rate scenarios (step 610). Once underwriter 1500 receives the DDC, underwriter 1500 generates a cash flow describing the result of using the pay rules of the deal structure to calculate project cash flows based on the scenarios in the DDC (step 620). Underwriter 1500 may also use the cash flow and the price of the bond to generate a cash flow report, a yield report, a decrement table, or a retail cash flow report. Once underwriter 1500 has generated the one or more reports, it may send each report to mortgage security issuer 1510 through communication channel 1400 (step 640). Any report generated by underwriter 1500 may be in an Extensible Markup Language (XML) format.

Referring again to FIG. 3, after processor 1700 receives the same report from underwriter 1500, it may then write the information in the report into a second master file (step 342). Then, processor 1700 may determine whether there is a match between the file containing the report information that processor 1700 created and the file created from the report information that underwriter 1500 created (step 342).

Figure 7:
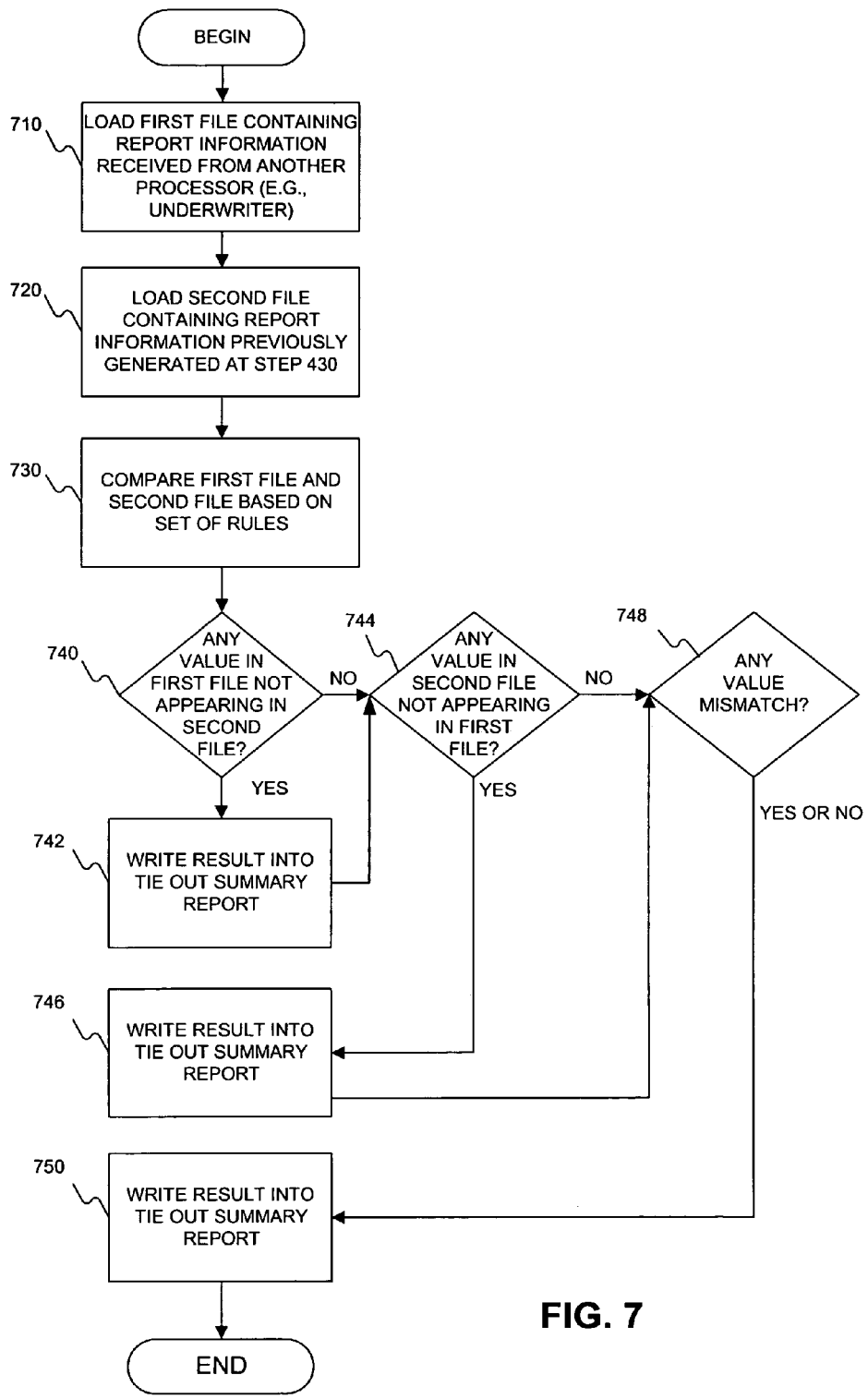
FIG. 7 is an exemplary flow chart depicting a determination of whether the two reports match consistent with the present invention.

FIG. 7 depicts an exemplary flowchart for the matching step 350 of FIG. 3. A match may occur based on various sets of data, such as bond class identifier, prepayment scenario, optional index rate scenario, and the values calculated for a given report (e.g., yield to maturity value in the yield report.). Processor 1700 begins the tie out process by loading the first file containing the report information received from underwriter 1500 (step 710). One achieves "tie out" when the two files being compared to one another have data fields that match given a predefined tolerance differentiating the fields.

Processor 1700 may load a second file containing the report information previously generated by processor 1700 in step 550 (step 720). The order in which these reports were loaded does not matter, nor does the number of reports loaded does not matter. Multiple reports can even be loaded at the same time.

Processor 1700 may compare the first file and the second file based on a set of logic rules (step 730). For example, in the case of a yield table, a "mismatch" condition occurs if class ID/collateral group number and prepayment/(optional) index rate scenarios match, but the absolute value of the difference between the external source yield minus the internal source yield is greater than the yield tolerance value. Processor 1700 may first determine whether any value in the first file does not appear in the second file (step 740). If all the values in the first file appear in the second file, processor 1700 may determine whether any value in the second file does not appear in the first file (step 742). If processor 1700 determines that all values in the second appear in the first file, then processor 1700 determines whether any value in the first file is a mismatch with the corresponding value in the second file (step 762). The values in the first and second files do not have to match exactly. For example, they may differ by a deviation that may be defined by the mortgage security issuer. For example, a typical allowable yield deviation would be +/−0.00002%.

If processor 1700 determines that a value in the first file is not in the second file, then processor 1700 may write the values found in the first file but not the second file into a Tie Out Summary Report (step 742). If processor 1700 determines that all values in the first file were in the second file, or if processor 1700 has already written the missing values into the Tie Out Summary Report, then processor 1700 may determine whether any value in the second file does not appear in the first file (step 744).

If processor 1700 determines that a value in the second file did not appear in the first file, then processor 1700 may write the missing values into the Tie Out Summary Report (step 746). Processor 1700 may then determine whether any value in the first file does not match the second file (step 748). Processor 1700 also may make this determination after it has written the missing values into the Tie Out Summary Report as in step 746. Whether processor 1700 determines if there is a mismatch or not in step 748, it writes the result into the Tie Out Summary Report. Processor 1700 then may send the Tie Out Summary Report to the user of processor 1700. The Tie Out Summary Report may list missing values from the first and second file as well as any mismatching values between those two files.

The systems used to carry out these processes are not critical, and may take any form that permits proper operation. Systems and methods consistent with the present invention also include computer-readable media that include program instruction or code for performing various computer-implemented operations based on the methods and processes of the invention. Examples of program instructions include, for example, machine code, such as produced by a compiler, and files containing a high level code that can be executed by the computer using an interpreter.

The invention claimed is:

1. A method of validating a model that generates a cash flow distribution, the method comprising:
    receiving from a database a first set of data representative of a deal structure including a series of classes distributing cash flow from underlying collateral;
    identifying whether the database identifies one or more bonds as the underlying collateral;
    projecting yields for the one or more bonds;
    identifying, using a data processor, bonds having a specified relationship between the projected yields and movements in one or more index rates, the specified relationship defining a sensitivity to the movements in the one or more index rates associated with the bonds;
    calculating, using the data processor, an index rate scenario for bonds having the specified relationship;
    creating, using the data processor, a first set of cash flow values based on the deal structure, the yields for the one or more bonds, and the index rate scenario;
    creating a set of first reports relating to the first set of cash flow values;
    storing, into memory using the data processor, the set of first reports;
    creating, using a data processor, a second set of cash flow values based on the deal structure, the yields for the one or more bonds, and the index rate scenario;
    creating a set of second reports relating to the second set of cash flow values;
    storing, into memory using at least one data processor, the set of second reports;
    comparing, using the data processor, the set of first reports with the set of second reports by:
        defining a tolerance representative of an amount of deviation by which the first set of cash flow values differ in relation to the second set of cash flow values;
        calculating, using at least one data processor for a first cash flow value in the set of first reports that differs from a second cash flow value in the set of second reports, an amount of difference; and determining whether the calculated amount of difference is greater than the defined tolerance;
determining, using the data processor, whether any cash flow values in the first set of reports are missing from the second set of reports;
determining, using the data processor, whether any cash flow values in the second set of reports are missing from the first set of reports; and
creating, using the data processor, a list that includes:
cash flow values that differ between the first set of reports and the second set of reports by an amount greater than the defined tolerance;
cash flow values in the first set of reports that are missing from the second set of reports; and
cash flow values in the second set of reports that are missing from the first set of reports.

2. The method of claim 1 further comprising:
generating a third report based on the comparison to indicate whether the set of first reports and the set of second reports match according to a set of rules.

3. The method of claim 1 further comprising
writing data from at least one report in the set of first reports and from at least one report in the set of second reports into a first file and a second file, respectively; and
wherein the comparing includes comparing the first and second files.

4. The method of claim 1, wherein receiving further comprises:
receiving, as the deal structure, a deal structure including one or more tranches, pay rules, and collateral stipulations.

5. The method of claim 4, wherein receiving further comprises:
receiving, as the deal structure, a rule representing a payment of a principal and a payment of interest on the tranche.

6. The method of claim 1, wherein receiving further comprises:
receiving, as the deal structure, a deal structure representative of a structured financial model.

7. The method of claim 1, wherein receiving further comprises:
receiving, as the deal structure, a deal structure representative of a Real Estate Mortgage Investment Conduit.

8. The method of claim 1, further comprising:
applying a payment rate associated with the deal structure to generate the second cash flow values in the set of second reports.

9. The method of claim 1, further comprising:
using rules representative of procedures for determining a set of prepayment scenarios for a bond to determine the first set of cash flow values in the set of first reports.

10. The method of claim 1, wherein generating the set of first reports further comprises:
sending to a source of the set of first reports the prepayment scenarios.

11. The method of claim 10 further comprising:
requesting the set of first reports based on the prepayment scenario.

12. The method of claim 4, wherein generating the set of second reports further comprises:
generating the second set of cash flow values that are associated with the bonds based on the pay rules and the prepayment scenarios.

13. The method of claim 1 further comprising:
determining whether a bond in the set of first reports did not appear in the set of second reports.

14. The method of claim 1 further comprising:
determining whether a payment scheme in the set of first reports did not appear in the set of second reports.

15. The method of claim 1 further comprising:
determining whether a bond in any of the set of first reports did not appear in any of the set of second reports.

16. The method of claim 1 further comprising:
determining whether a payment scheme in any of the set of first reports did not appear in any of the set of second reports.

17. The method of claim 1 further comprising:
using as the prepayment scenarios, a speed of candidate payments to an investor.

18. The method of claim 8, wherein the payment rate is a pricing speed.

19. The method of claim 1, wherein the set of first reports are in an Extensible Markup Language (XML) format.

20. The method of claim 1, wherein the comparing step further comprises:
converting the set of second reports into an Extensible Markup Language (XML) format.

21. The method of claim 1, wherein the model is validated when the list indicates that the set of first reports and the set of second reports match.

22. A system of validating a model that generates a cash flow distribution comprising:
at least one data processor; and
at least one memory containing instructions which, when executed, cause the at least one data processor to:
receive a first set of data representative of a deal structure including a series of classes distributing cash flow from underlying collateral;
identify whether a database includes one or more bonds as the underlying collateral;
identify bonds having a specified relationship between the projected yields and movements in one or more index rates, the specified relationship defining a sensitivity to the movements in the one or more index rates associated with the bonds;
project yields for the one or more bonds;
calculate an index rate scenario for the bonds having the specified relationship;
create a first set of cash flow values based on the deal structure, the yields for the one or more bonds, and the index rate scenario;
create a set of first reports relating to the first set of cash flow values;
store in the at least one memory the set of first reports;
create a second set of cash flow values based on the deal structure, the yields for the one or more bonds, and the index rate scenario;
create a set of second reports relating to the second set of cash flow values;
store in the at least one memory the set of second reports;
compare the set of first reports and the set of second reports by:
defining a tolerance representative of an amount of deviation by which the first set of cash flow values differ in relation to the second set of cash flow values;
calculating, for a first cash flow value in one of the first reports that differs from a second cash flow value in one of the second reports, an amount of difference; and
determining whether the calculated amount of difference is greater than the defined tolerance;

determine whether any cash flow values in the first set of reports are missing from the second set of reports;

determine whether any cash flow values in the second set of reports are missing from the first set of reports; and create a list that includes:
- cash flow values that differ between the set of first reports and the set of second reports by an amount greater than the defined tolerance;
- cash flow values in the first set of reports that are missing from the second set of reports; and
- cash flow values in the second set of reports that are missing from the first set of reports.

23. A non-transitory computer-readable medium which stores a set of instructions which when executed by one or more processors performs a method for validating a model, wherein the method generates one or more cash flow distributions, the method executed by the set of instructions comprising:

receiving a first set of data representative of a deal structure including a series of classes distributing cash flow from underlying collateral;

identifying whether the database includes one or more bonds as the underlying collateral;

identifying bonds having a specified relationship between the projected yields and movements in one or more index rates, the specified relationship defining a sensitivity to the movements in the one or more index rates associated with the bonds;

projecting yields for the one or more bonds;

calculating an index rate scenario for the bonds having the specified relationship;

creating a first set of cash flow values based on the deal structure, the yields for the one or more bonds, and the index rate scenario;

creating a set of first reports relating to the first set of cash flow values;

storing, into memory, the set of first reports;

creating a second set of cash flow values based on the deal structure, the yields for the one or more bonds, and the index rate scenario;

creating a set of second reports relating to the second set of cash flow values;

storing, into memory, the set of second reports;

comparing the set of first reports and the set of second reports by:
- defining a tolerance representative of an amount of deviation by which the first set of cash flow values differ in relation to the second set of cash flow values;
- calculating, for a first cash flow value in the set of first reports that differs from a second cash flow value in the set of second reports, an amount of difference; and
- determining whether the calculated amount of difference is greater than the defined tolerance;

determining whether any cash flow values in the first set of reports are missing from the second set of reports;

determining whether any cash flow values in the second set of reports are missing from the first set of reports; and creating a list that includes:
- cash flow values, that differ between the set of first reports and the set of second reports by an amount greater than the defined tolerance;
- cash flow values in the first set of reports that are missing from the second set of reports; and
- cash flow values in the second set of reports that are missing from the first set of reports.

\* \* \* \* \*